United States Patent
Michon et al.

(10) Patent No.: US 6,282,167 B1
(45) Date of Patent: *Aug. 28, 2001

(54) OFDM SIGNAL ORGANIZED SO AS TO SIMPLIFY RECEPTION

(75) Inventors: Vincent Michon; Bernard Le Floch; Bertrand Sueur, all of Rennes; Marc Riviere, Liffre, all of (FR)

(73) Assignee: France Telecom, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/765,162
(22) PCT Filed: Jun. 13, 1995
(86) PCT No.: PCT/FR95/00775
§ 371 Date: Mar. 19, 1997
§ 102(e) Date: Mar. 19, 1997
(87) PCT Pub. No.: WO95/34967
PCT Pub. Date: Dec. 21, 1995

(30) Foreign Application Priority Data

Jun. 16, 1994 (FR) .................................................. 94 07612

(51) Int. Cl.⁷ .................................................. H04J 11/00
(52) U.S. Cl. ........................................ 370/203; 370/482
(58) Field of Search .................................. 370/203, 206, 370/208, 210, 344, 489, 482, 484, 486, 209; 375/130, 242

(56) References Cited

U.S. PATENT DOCUMENTS

| | | | | |
|---|---|---|---|---|
| 4,884,139 | * | 11/1989 | Pommier | 358/142 |
| 5,228,025 | * | 7/1993 | Le Floch et al. | 370/20 |
| 5,235,647 | * | 8/1993 | Van De Kerkhof | 381/37 |
| 5,282,222 | * | 1/1994 | Fattouche et al. | 375/1 |
| 5,345,439 | * | 9/1994 | Marston | 370/18 |
| 5,491,773 | * | 2/1996 | Veldhuis et al. | 395/2.38 |

FOREIGN PATENT DOCUMENTS

| | | |
|---|---|---|
| 0 589 709 A2 | 3/1994 | (EP) . |
| 0 589 709 A3 | 3/1994 | (EP) . |

OTHER PUBLICATIONS

Robert W. Chang, Synthesis of Band–Limited Orthogonal Signals for Multichannel Data Transmission, Bell System Technical Journal, vol. 45, No. 10, Dec. 1966, New York US, pp. 1775–1796.

Enrico Del Re, Romanio Fantacci, Digital Multicarrier Demodulator for Regenerative Communication Satellites, Alta Frequenza, vol. LVII, No. 10, Dec. 1988, Milano, IT, pp. 545–559.

Paul G.M. de Bot et al., An Example of a Multi–Resolution Digital Terrestrial TV Modem, IEEE International Conference on Communications 1993, May 23, 1993, Geneva, CH, pp. 1785–1790.

* cited by examiner

Primary Examiner—Joe H. Cheng
Assistant Examiner—Kim T. Nguyen
(74) Attorney, Agent, or Firm—Kinney & Lange, P.A.

(57) ABSTRACT

The invention relates to a signal intended to be transmitted towards a plurality of receivers, of the type comprising at least two source signals and consisting of a plurality of independently modulated substantially orthogonal carrier frequencies distributed over a predetermined frequency band. According to the invention, said frequency band (12) is divided into at least two frequency sub-bands ($13_1$–$13_4$) each comprising a set of said substantially orthogonal carrier frequencies (11), and to each of said sub-bands is allocated one of said source signals, so that a receiver may retrieve from the transmitted signal, by filtration, at least one of said sub-bands and perform demodulation processing only on the carrier frequencies contained in the retrieved sub-bands. The invention also relates to a transmission process as well as to a receiver of such signal.

14 Claims, 2 Drawing Sheets

OFDM SIGNAL ORGANIZED SO AS TO SIMPLIFY RECEPTION

BACKGROUND OF THE INVENTION

The field of the invention is signal transmission using simultaneously several orthogonal (or quasi-orthogonal) carrier frequencies, each coded by distinct data elements.

These signals are generally called OFDM (Orthogonal Frequency Division Multiplex) signals. This type of OFDM signal is used for example in the digital broadcasting system described particularly in French patent FR-86 096322 filed on Jul. 2, 1986, and in the document entitled "Principes de modulation et de codage canal en radio diffusion numeric vers les mobiles" (Principles of channel modulation and coding in digital radio broadcasting to mobiles) (by M. Alard and R. Lassalle; U.E.R. review No. 224, August 1987, pp. 168–190) and known under the name of the COFDM (Coded Orthogonal Frequency Division Multiplex) system.

This COFDM system was developed largely as part of the European DAB (Digital Audio Broadcasting) project. It is digital. More generally, it enables the transmission of any type of digital or analog signal (sampled but not necessarily quantified).

Special demodulators must be used to demodulate these digital signals with frequency multiplexing. For example, this type of demodulator is described in the above mentioned patent document FR-86 09622.

It is known that one essential element of a multicarrier signal receiver is the demodulation circuit which extracts raw information carried by each carrier taken separately, from the received signal (the multiplex of orthogonal carriers).

Conventionally, this circuit carries out mathematical transform the signal, and for example a Discrete Fourier Transform (DFT). Many other transforms may be used. However, this type of circuit will be referred to as a DFT circuit in the following, for non-restrictive simplification purposes.

The complexity of this type of circuit is proportional firstly to the number of frequencies transmitted simultaneously (frequency dimension), and secondly to the duration $T_s$ of transmitted symbols (time dimension). This DFT circuit is a complex and therefore expensive element. Therefore, it is essential that this circuit should be simplified, particularly for low cost receivers.

According to known techniques, the time dimension is limited by reducing the symbol time $T_s$ and/or the guard interval $\Delta$ inserted between two consecutive symbols. This limits the number of data processed by the DFT, obviously to the detriment of the received signal quality. As the symbol time increases, the channel selectivity effect is lower, and for a given guard interval sufficient to limit the Inter Symbol Interference to a previously chosen value, the transmitted throughput increases with the length of the symbol time.

In other words, the choice of the DFT size is always a compromise between the received signal quality and the cost price of this DFT.

It is impossible to vary the frequency dimension using known techniques. The DFT must systematically take account of all N carriers forming the transmitted multiplex, even if the information searched by the receiver is distributed only on some of the carrier frequencies.

Conventionally, a transmitted OFDM signal can carry several independent signals. For example in the case of television signals, four distinct signals could be transmitted at 6 Mbit/s on one OFDM signal occupying an 8 MHz band (with a spectral efficiency of 4 bits/s/Hz). Although it would be desirable to recover a single source signal, it is necessary to take account of all carriers at the input to the DFT, which induces complex and partially unnecessary calculations.

Furthermore, in general it is better to use the maximum number of carrier frequencies, particularly to increase the duration of symbols transmitted as described previously.

Once again, we need to find a compromise between the number of carriers and the complexity of the demodulation circuit.

BRIEF SUMMARY OF THE INVENTION

The invention has notably the objective of overcoming these drawbacks in state of the art techniques.

More precisely, a purpose of the invention is to provide a technique that reduces processing to be done in receivers without any loss of signal quality, in other words particularly without it being necessary to reduce the symbol time.

Another purpose of the invention is to provide this type of technique without inducing excessive constraints on the transmission, and particularly in which it is not necessary to widen the frequency band used.

Another purpose of the invention is to provide this type of technique in order to define several receiver quality levels.

These objectives, and others that will become apparent later, are achieved according to the invention by a signal to be transmitted to several receivers, of the type comprising at least two source signals and composed of several substantially orthogonal carrier frequencies modulated independently and distributed on a determined frequency band; said frequency band being organized down into at least two frequency subbands each comprising a set of said substantially orthogonal carrier frequencies, and in which one of said source signals is assigned to each of said subbands, so that a receiver can extract at least one of said subbands from the transmitted signal by filtering, and can carry out demodulation processing solely on carrier frequencies contained in the extracted subbands.

Subbands refer to carrier subassemblies that are not necessarily separate (one carrier may belong to several subbands), or contiguous (two carriers in one subband may be separated by one or several carriers that do not belong to this subband). Some source signals could also be "empty", in other words associated with non-transmitted carriers.

DETAILED DESCRIPTION OF THE PREFERRED EMBODIMENT

Figure 1:
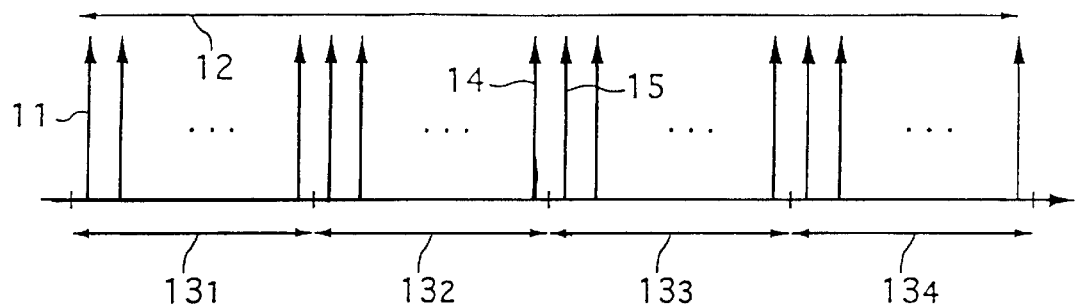
FIG. 1 shows a signal according to the present invention corresponding to four independent television signals at 6 Mbit/sec each.

Thus the invention concerns a new multiplexed signal structure with orthogonal carriers in order to limit processing carried out in receivers.

More precisely, the invention decorrelates the number of carriers Q processed in the receiver from the number P (Q<P) of carriers transmitted. Thus this gives the advantages of a "large" inverse DFT (P points) during transmission, and a "small" DFT (Q points) on reception.

Note that this signal structure is unrelated to the conventional technique consisting of transmitting each source signal independently, in distinct and separate frequency bands.

In this case, different signals would be transmitted by apparently different transmitters. This can induce very large power differences, and therefore disturbances, between two signals. On the contrary, according to the invention a single signal is tuned and transmitted.

Furthermore, according to known techniques, it is necessary to create a very wide frequency band (of the order of 1 MHz) between two signals in order to limit interference (orthogonality by separate frequency supports). On the contrary according to the invention, subbands may be adjacent due to the fact that the transmitted signal is tuned as a whole, and carriers are orthogonal, even from subband to subband.

This signal structure is not at all obvious, looking at known OFDM signals. Firstly, it seems to contradict the idea that it is preferable to distribute data over the widest possible frequency band in order to benefit from the best frequency diversity. Furthermore, it cannot be used directly in OFDM receivers. As will be described later, the transposition of the received signal has to be controlled to center the required subband(s).

It is beneficial if said subbands are adjacent.

Preferably, said subbands will have identical bandwidths. This can simplify processing in receivers, and more easily maintain a good frequency diversity at the transmission, provided that a suitable decoding, preferably with maximum probability, is implemented independently on each subband.

Optionally, assignment of said source signals to said subbands may be variable in time, in order to improve the frequency diversity.

For example, said assignment may be modified at each frame of said signal. A frame is a set of one or several symbols.

In particular, it is possible that the transmitter will change the assignment for each new frame. This can counter selective fading affecting each of the subbands by maximum frequency diversity enabled by the band occupied by all these subbands.

According to one beneficial embodiment of the invention, at least a first of said source signals contains basic information for a program, and at least a second of said source signals corresponds to information complementary to said basic information, such that at least two receiver quality levels are defined:

a first quality level corresponding to receivers capable of processing only the subband corresponding to said source signal;

a second quality level corresponding to receivers capable of processing subbands corresponding to the first and second source signals.

A program means one or several source signals (or components), in which the subbands of which are preferably adjacent. Thus a program may have several components, and conversely a component may belong to several programs.

In particular, this means that several receiver quality levels can be defined. For example in the case of television signals, it will be possible to allow for a first subband containing information used to restore a medium quality image and a second subband including either complementary information enabling cooperation with information in the first subband, to restore a high definition image, or information used to rebuild this second image.

Thus, at least three types of receiver may be defined:
an entry quality receiver, which only processes the first subband;
a medium quality receiver which processes either the first or the second subbands (preferably close in the frequencies space);
a high quality receiver processing the entire transmitted signal, and allowing either simultaneous display of several programs, for example using the picture in picture technique, or reproduction of the original high definition image.

The invention also concerns a process for transmitting a signal like that described above including the following steps:
assignment of a determined frequency band to said signal, where several orthogonal carrier frequencies are defined in the frequency band;
breakdown of said frequency band into at least two frequency subbands, each comprising a set of said approximately orthogonal carrier frequencies;
reception of at least two independent source signals to be transmitted;
assignment of one of said frequency subbands to each of said source signals;
grouping of said subbands, so as to form said signals to be transmitted; and
transmission of said signal to be transmitted.

It is beneficial if said subbands are adjacent.

Preferably, said subband grouping step is preceded by an independent coding and frequency and time interlacing step for each of said source signals, so as to obtain a set of coded signals each of which modulates one of said carrier frequencies of the subband assigned to said source signal.

The invention also concerns receivers of this type of signal. Advantageously, these receivers comprise:
means for selecting a given program, corresponding to one of said subbands; and
mathematical transformation means acting on carrier frequencies contained in the selected subband(s).

According to one essential characteristic of the invention, means for selecting a given program are capable of transposing the received signal, which is not a fixed operation (unlike classical techniques). On the contrary, this transposition is offset by an amount that depends on the required subbands, before the DFT is applied. Obviously, this DFT only applies to extracted subbands, which correspondingly reduces the processing to be done.

According to a first analog type of embodiment, said selection means include analogue transposition means comprising a first RF transposition oscillator and a second IF transposition oscillator, and means for controlling the oscillation frequency of said first and/or said second oscillator as a function of the selected subband(s), so that they will be centered at a predetermined frequency.

According to a second digital embodiment, said selection means include first analog digital transposition means, and second digital transposition means that are variable as a function of the selected subband(s) and subsampling means.

Preferably, said mathematical transformation means act on a number of carrier frequencies that is slightly greater than the number of carrier frequencies contained in the extracted subband(s), in order to compensate for the imperfection due to extraction filtering of said subbands. In particular an imperfection means folding over of residual spectra.

Other characteristics and advantages of the invention will become clear in reading the following description of a preferred embodiment of the invention which is given as a simple and non-restrictive example for illustration purposes only, and the joint drawings, in which:

As described above, the invention concerns a signal formed from several orthogonal frequencies. The embodiment described below corresponds to broadcasting of four television signals according to the COFDM technique mentioned above.

Obviously, this is just an example; the number and size of sub-bands, the type of source signals and the transmission technique used may vary.

Therefore the example in FIG. 1 considers an OFDM signal, conventionally containing 8 192 carriers 11(of which 7 000 are useful), distributed over a frequency range 12 of 9 MHz. For coding at a rate of 4 bit/s/Hz, it is then possible to transmit about 24 Mbit/s.

According to the invention, the frequency band 12 is broken into 4 subbands, or blocks $13_1$ to $13_4$, each of which can carry 6 Mbit/s. These 6 Mbit/s may each correspond to a standard television program. Obviously, the number and size of these blocks are simply given for guidance.

Each block $13_i$ carries data corresponding to an independent or standalone signal. In other words, there is no need to recover carrier frequencies other than those in the block considered, in order to rebuild this signal. However no separation is necessary, for example, between carriers 14 and 15.

However, note that a standalone signal does not necessarily correspond directly to a program (for example television). Complementary signals may also be used to improve the quality of the basic signal, or more generally any signal forming part of a set.

In the case of a COFDM signal, the signal transmitted in RF is formed of a time sequence of symbols of duration Ts=ts+Δ where ts is the duration of the useful symbol (ts=NT), on which the demodulation will be applied and where Δ represents the duration of the guard interval.

Each symbol is then written:

$$x(t) = \sum_{i=0}^{B-1} x_i(t) = \sum_{i=0}^{B-1} \text{Re} \sum_{k \in K_i} C_k e^{2i\pi f_k t}$$

where t∈[−Δ, ts]

and $f_k = f_0 + k/ts$ where $C_k$=element of the modulation alphabet (finite or not)

$f_0$=arbitrary frequency

N=total number of tuned carriers. For practical reasons, N is often integer power of 2 (for example N=8192) greater than the number of carriers actually modulated. The additional (N−P) carriers (called "untransmitted") are then modulated by 0($C_k$=0 for k∈ξξ being the set of useful carriers in the signal.

Or $$x(t) = \sum_{k=0}^{N-1} C_k e^{2i\pi f_k t}$$

where: B is the number of blocks $K_i$ is the set of integers [$k_i$, $k_{i+1}$]

where $k_0$=0 and $k_{i+1}=k_i+Q_i$($Q_i$ being arbitrary, number of carriers in block Bi).

Figure 2:
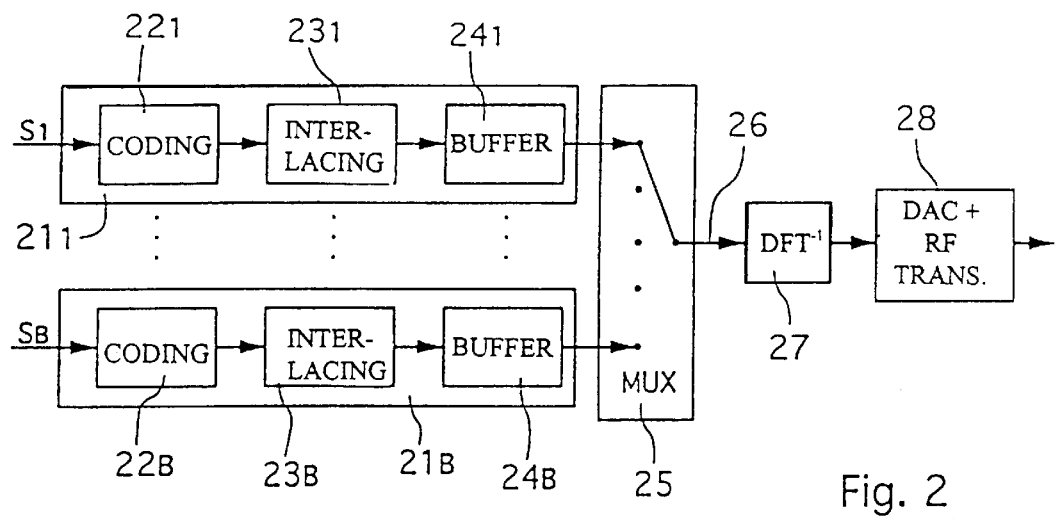
FIG. 2 shows a block diagram of a transmitter building and transmitting the signal illustrated in FIG. 1.

For example, the signal may be formed from 8 192 carriers organized in 6 blocks, of which only 4 are useful:

$B_0$ formed of carriers $k_0$=0 to 595, carriers not transmitted;

$B_1$ formed of carriers $k_1$=596 to 2345, with carriers assigned to a first program;

$B_2$ formed of carriers $k_2$=2346 to 4095, with carriers assigned to a second program;

$B_3$ formed of carriers $k_3$=4096 to 5845, with carriers assigned to a third program;

$B_4$ formed of carriers $k_4$=5846 to 7595, with carriers assigned to a fourth program;

$B_5$ formed of carriers $k_5$=7596 to 8191, not transmitted;

FIG. 2 presents the general block diagram of a transmitter capable of generating and transmitting a signal according to the invention.

It comprises firstly four parallel independent lines $21_1$ to $21_B$ corresponding to B source signals, and B blocks in the signal for this particular example.

Each source signal $S_i$(where I varies from 0 to B−1) is subjected to signal coding $22_i$, in the case of a digital signal. For example, the coding described in the Alard and Lassalle document mentioned above may be used. An analog signal will simply be sampled.

The data are then advantageously interlaced in frequency and/or in time ($23_i$). Obviously, this interlacing is done in a stable manner, in other words such that data in signal $S_i$ remain in the block assigned to $S_i$.

Data are then stored in buffer memories $24_i$ which make the complete signal formed from a series of symbols $C_k$ 26 by frequential multiplexing 25 (in other words successive reading of each block in buffer $24_i$).

The order in which buffers are read may be different in each frame (according to a known receiver sequence). It is thus possible to maintain the frequency diversity qualities of a conventional COFDM signal.

The $C_k$ symbols are then processed conventionally, by inverse Fourier transformation (DFT$^{-1}$)27, then by digital/analog conversion, transposition in RF and transmission 28. As mentioned previously, a single signal is transmitted. Therefore, there is no significant power difference between two blocks.

Due to the signal structure, it is possible to use a transformation in reception acting on a smaller number of points than the inverse transformation used in transmission.

Figure 3:
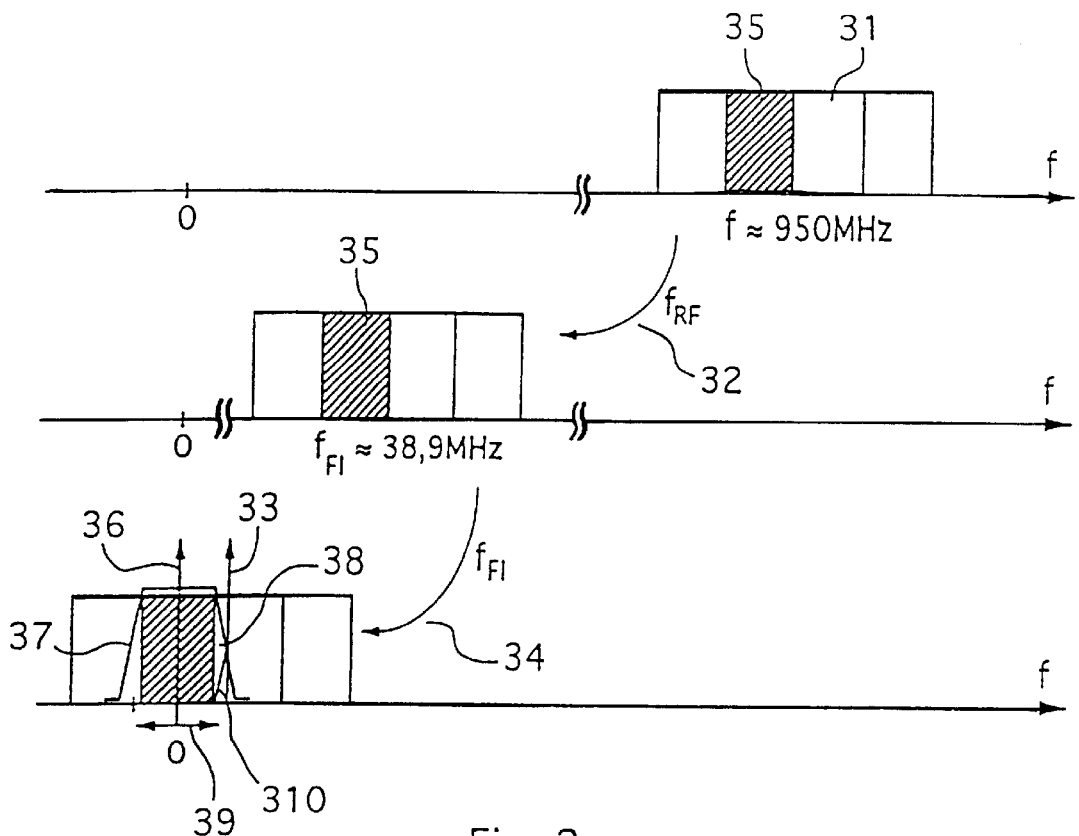
FIG. 3 illustrates the principle of the transposition of the signal into the base band according to the present invention.

In doing this, the transposition in low frequency done by the receivers is significantly different from that done conventionally, as shown in FIG. 3 in the case of an analogue transposition.

Conventionally, signal 31 is transmitted in radio frequency (RF), for example at 950 MHz. Therefore, it is subjected to a first multiplication 32 by a frequency $F_{RF}$ which brings it to an intermediate frequency (IF) for example at 38.9 MHz. A second multiplication 34 by a frequency $f_{if}$ changes the signal to low frequency.

Conventionally and for a given RF channel, the frequencies $F_{RF}$ and $f_{IF}$ are fixed. However, according to an analogue embodiment of the invention, one of them must be variable.

It is required to process only one signal block, for example block 35. Therefore, the transposition frequencies are adjusted so that this block 35 is centered on the zero frequency 36 after transposition (although usually the complete signal is centered). For example, if $f_{iF}$ is adjusted, this frequency could be $f_{IF}=38.9\pm f_i$ where $f_i$ depends on which block is selected.

After transposition, the selected block is filtered (37). In order to select all useful data, a filter pattern has to be used which also includes useless elements (attenuated band due to filtering 38 which is necessarily not rectangular which would be ideal). Consequently, a slightly wider transformation 39 will also be applied.

More precisely, a sampling frequency 33 will be used (for example 2.25 MHz) slightly greater than the block width (for example 1.92 MHz), in order to force oversampling. Consequently, transformation 39 is defined so as to encompass half of the attenuated band 38. Thus, spectrum 310 is folded back and remains in the attenuated band zone, and therefore does not pollute the useful signal. For example, if block 35 contains 1750 points, the transformation 89 will apply to 2048 points.

Figure 4:
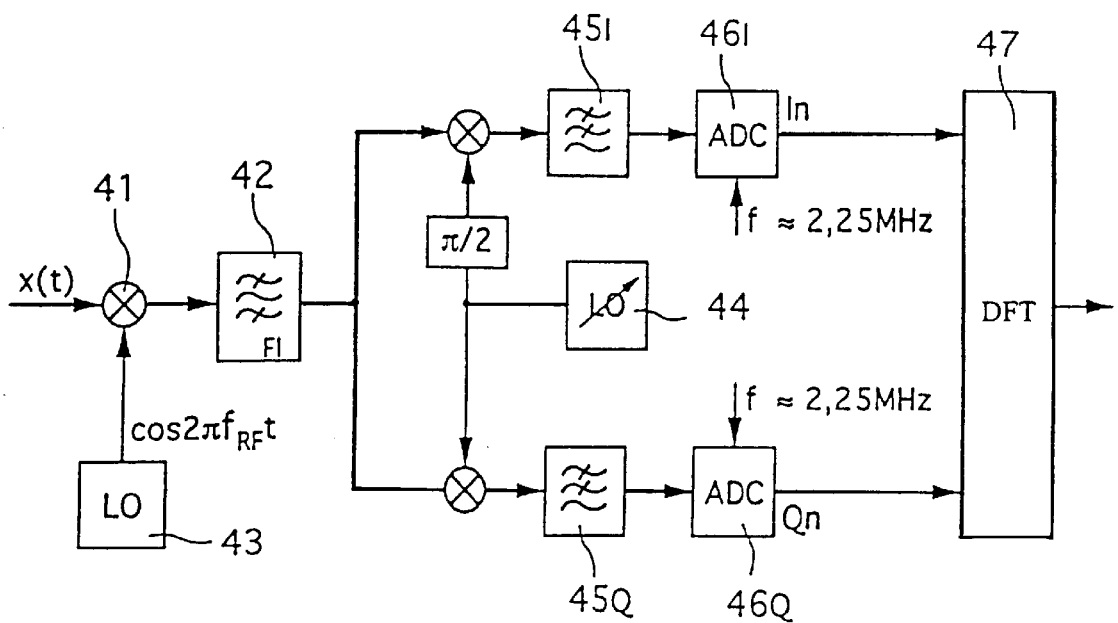
FIG. 4 shows an analog demodulator according to the present invention.

FIG. 4 illustrates the case of an analogue demodulator making use of this technique.

The received signal x (t) is conventionally transposed from RF to IF by the demodulator 41 which multiplies x(t) by $\cos 2\pi f_{RF}t$ and is then filtered by a FOS filter 42 centered on the IF frequency, for example of the order of 35 MHz. The frequency $f_{RF}$ is output by an RF oscillator 43 with an adjustable tuner frequency used to select the RF channel.

The second transposition is then done, which is variable as a function of the selected block. It is done by a second variable oscillator 44 adjustable within the $f_0, \ldots f_{B-1}$ band in order to bring the required block into the base band.

The demodulation then takes place conventionally, to obtain two channels $I_n$ and $Q_n$ after low pass filtering 45$_I$ and 45$_Q$ and sampling 46$_I$ and 46$_Q$, sampled at frequency $f_s$ (for example 2.25 MHz) which are input to a DFT circuit 47 applied only to the number of points (or slightly more) making up the block (for example 2048).

Figure 5:
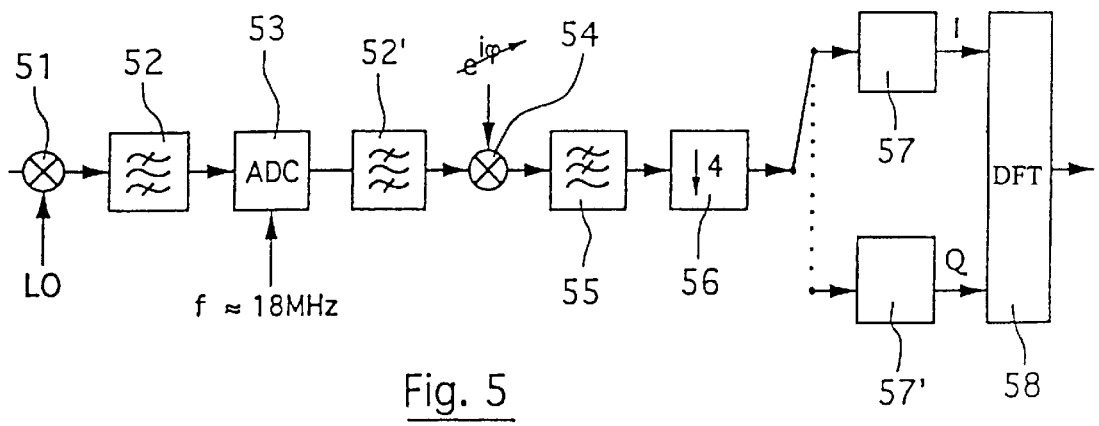
FIG. 5 shows a digital demodulator according to the present invention.

The RF and IF frequencies are not affected in the case of a digital transposition as shown in FIG. 5. However, sampling is done at a much higher frequency (for example eight times higher) than in analogue.

Thus, the signal is conventionally transposed (51), filtered (52), digitized (53) at a frequency $f_s$ of the order of 18 MHz, and is then filtered again (52').

A block is then selected by multiplying 54 each sample by $e^{i\phi}(t)$ where $\phi(t)$ depends on the required block. The signal obtained is filtered by a low pass filter 55 and is then subsampled 56 by order 4 in order to recover the required signal which is input to a DFT circuit 58 after interpolation filtering 57, 57'.

What is claimed is:

1. A method for transmitting and receiving at least two independent source signals, comprising the steps of:
   obtaining said at least two independent source signals in the form of independent series of coded bits;
   assignment of a determined frequency band to an OFDM signal to be transmitted, several approximately orthogonal carrier frequencies being defined in said frequency band;
   breakdown of said frequency band into at least two frequency subbands, each of said subbands comprising a set of said approximately orthogonal carrier frequencies;
   assignment of each of said frequency subbands to one of said independent source signals;
   selectively modulating the carrier frequencies of each frequency subband with the coded bits of the corresponding source signal;
   grouping said modulated frequency subbands to form a modulated OFDM signal;
   tuning and transmitting the modulated OFDM signal as a whole;
   receiving the modulated OFDM signal in a receiver;
   extracting from the modulated OFDM signal at least one, but not all the frequency subbands, by filtering; and
   performing demodulation processing solely on the frequency carriers contained in the extracted subbands of the modulated OFDM signal.

2. Method according to claim 1, characterized in that said subbands are adjacent.

3. Method according to claim 1, characterized in that said subband grouping step is preceded by an independent coding step and frequency and time interlacing of each of said source signals, so as to obtain a set of coded signals designed to modulate each of said carrier frequencies of the subband assigned to said source signal.

4. Method according to claim 1, characterized in that said source signals are assigned to said subbands in a manner that varies with time, in order to maximize the frequency diversity.

5. Method according to claim 4, characterized in that said assignment is modified on each transmission of a frame of said signal.

6. Method according to claim 1, wherein the modulated OFDM signal is a single signal tuned as a whole by a sole modulator modulating simultaneously the substantially orthogonal frequency carriers, the orthogonal frequency carriers being orthogonal in each subband and from subband to subband.

7. Method according to 6, characterized in that said subbands are adjacent.

8. Method according to claim 6, characterized in that said subbands have identical bandwidths.

9. Method according to claim 1, characterized in that at least a first of said source signals corresponds to basic information for a program and at least a second of said source signals corresponds to information complementary to said basic information, in order to define at least two receiver quality levels:
   a first quality level applicable to receivers capable of processing only the subband corresponding to said first source signals; and
   a second quality level corresponding to receivers capable of processing subbands corresponding to the first and second source signals.

10. Method according to claim 1, characterized in that performing demodulation processing further comprises:
   selecting a given program corresponding to at least one of the frequency subbands using a selection means; and
   acting on the carrier frequencies contained in the selected subband(s) using a mathematical transformation means.

11. Method according to claim 10, characterized in that said selection means include analog transposition means including a first RF transposition oscillator and a second IF transposition oscillator, and means of controlling an oscillation frequency of said first RF transposition oscillator and/or said second IF transposition oscillator as a function of the selected subbands, so that the selected subbands are centered on a predetermined frequency.

12. Method according to claim 10, characterized in that said selection means comprises:

first analog transposition means and second digital transposition means that are variable as a function of the selected subband(s); and subsampling means.

13. Method according to claim 10, characterized in that said mathematical transformation means act on a number of carrier frequencies slightly exceeding the number of carrier frequencies contained in the extracted subband(s), so as to compensate for imperfection due to extraction filtering of said subbands.

14. A method for transmitting and receiving an OFDM signal, the method comprising:

obtaining at least two independent source signals, each source signal being in the form of an independent series of coded bits;

assigning a determined frequency band on which the OFDM signal will be transmitted;

defining approximately orthogonal carrier frequencies in the determined frequency band;

breaking the determined frequency band down into at least two frequency subbands, each of said subbands comprising a set of said approximately orthogonal carrier frequencies;

assigning each independent source signal to one of said frequency subbands;

transmitting a modulated OFDM signal by selectively modulating the carrier frequencies of each frequency subband with the coded bits of the correspondingly assigned source signal and grouping said modulated frequency subbands to form said modulated OFDM signal, said modulated OFDM signal being tuned and transmitted as a whole, so that said frequency carriers are orthogonal in each of said subbands and from subband to subband;

receiving the modulated OFDM signal;

extracting at least one but less than all of the frequency subbands from the received OFDM signal by filtering; and performing demodulation processing solely on the frequency carriers contained in the extracted subbands of the received modulated OFDM signal.

* * * * *